(12) United States Patent
Kobayashi et al.

(10) Patent No.: US 10,774,691 B2
(45) Date of Patent: Sep. 15, 2020

(54) COMBINED CYCLE POWER PLANTS WITH A STEAM CONNECTION LINE

(71) Applicant: MITSUBISHI HEAVY INDUSTRIES COMPRESSOR CORPORATION, Tokyo (JP)

(72) Inventors: Masahiro Kobayashi, Hiroshima (JP); Hideki Nagao, Hiroshima (JP)

(73) Assignee: MITSUBISHI HEAVY INDUSTRIES COMPRESSOR CORPORATION, Tokyo (JP)

(*) Notice: Subject to any disclaimer, the term of this patent is extended or adjusted under 35 U.S.C. 154(b) by 128 days.

(21) Appl. No.: 15/538,444

(22) PCT Filed: Dec. 25, 2014

(86) PCT No.: PCT/JP2014/084253
§ 371 (c)(1),
(2) Date: Jun. 21, 2017

(87) PCT Pub. No.: WO2016/103382
PCT Pub. Date: Jun. 30, 2016

(65) Prior Publication Data
US 2017/0350279 A1    Dec. 7, 2017

(51) Int. Cl.
*F01K 23/10*     (2006.01)
*F02C 6/18*      (2006.01)
(Continued)

(52) U.S. Cl.
CPC .......... *F01K 23/103* (2013.01); *F01K 23/10* (2013.01); *F01K 23/106* (2013.01); *F02C 6/18* (2013.01);
(Continued)

(58) Field of Classification Search
CPC ........ F01K 23/10; F01K 23/12; F01K 23/103; F01K 23/106; F01K 23/02
See application file for complete search history.

(56) References Cited

U.S. PATENT DOCUMENTS 3,953,966 A  *  5/1976  Martz .................... F01K 13/02
                                                      60/783
3,955,358 A  *  5/1976  Martz .................... F01K 13/02
                                                      60/39.182
(Continued)

FOREIGN PATENT DOCUMENTS

JP     63-117107 A      5/1988
JP     2-195101 A       8/1990
(Continued)

OTHER PUBLICATIONS

International Search Report dated Mar. 24, 2015 in PCT Application No. PCT/JP2014/084253 with an English Translation.
(Continued)

*Primary Examiner* — Scott J Walthour
*Assistant Examiner* — Todd N Jordan
(74) *Attorney, Agent, or Firm* — Birch, Stewart, Kolasch & Birch, LLP

(57) ABSTRACT

A combined cycle plant includes: a plurality of turbine devices; and a connection line, in which each of the plurality of turbine devices includes a gas turbine unit which includes a gas turbine, a first compressor, and a waste heat recovery boiler, a steam turbine unit which includes a steam turbine, and a second compressor which is driven by power obtained from the steam turbine and contributes to compression of a process gas in a plant, and steam supply lines which supplies steam lead out from the waste heat recovery boiler to the steam turbine, and the connection line is disposed between the steam supply lines configuring the plurality of turbine (Continued)

devices and connect the plurality of steam supply lines to each other.

5 Claims, 3 Drawing Sheets

(51) Int. Cl.
*F01K 13/00* (2006.01)
*F01K 23/16* (2006.01)

(52) U.S. Cl.
CPC ............ *F01K 13/006* (2013.01); *F01K 23/16* (2013.01); *Y02E 20/16* (2013.01)

(56) References Cited

U.S. PATENT DOCUMENTS

| | | | | |
|---|---|---|---|---|
| 4,270,357 | A | * | 6/1981 | Rossi ...................... F01K 7/345 60/648 |
| 7,107,774 | B2 | * | 9/2006 | Radovich ................ F01K 13/02 122/7 B |
| 2009/0320438 | A1 | | 12/2009 | Koganezawa et al. |
| 2010/0058764 | A1 | | 3/2010 | Conchieri |
| 2010/0305768 | A1 | * | 12/2010 | Holt ........................ F01K 13/02 700/288 |

FOREIGN PATENT DOCUMENTS

| | | |
|---|---|---|
| JP | 4-124413 a | 4/1992 |
| JP | 10-54212 A | 2/1998 |
| JP | 11-117712 A | 4/1999 |
| JP | 2004-169625 A | 6/2004 |
| JP | 2006-46087 A | 2/2006 |
| JP | 2007-255389 A | 10/2007 |
| JP | 2010-65695 A | 3/2010 |
| JP | 2013-15146 A | 1/2013 |

OTHER PUBLICATIONS

Written Opinion dated Mar. 24, 2015 in PCT Application No. PCT/JP2014/084253 with an English Translation.

* cited by examiner

COMBINED CYCLE POWER PLANTS WITH A STEAM CONNECTION LINE

TECHNICAL FIELD

The present invention relates to a combined cycle plant which includes a gas turbine unit which includes a gas turbine and a steam turbine unit which includes a steam turbine and a waste heat recovery boiler.

BACKGROUND ART

In the related art, a combine cycle plant is used, which includes a gas turbine unit having a gas turbine including a compressor, a combustor, and a turbine, and a steam turbine unit having a steam turbine and a waste heat recovery boiler (HRSG) (for example, refer to PTL 1).

In the gas turbine unit, air compressed using an air compressor is fed to the combustor, the air is heated along with a fuel supplied to the combustor, a high-temperature and high-pressure gas generated in the combustor is expanded in the turbine, and power in a first generator connected to the turbine is generated. In this case, a high-temperature (for example, 600° C.) exhaust gas is discharged from the gas turbine unit.

In the steam turbine unit, steam is generated in the waste heat recovery boiler using the exhaust gas, the steam is supplied to the steam turbine, power in a second generator connected to the steam turbine is generated, and steam is discharged from the steam turbine.

The steam discharged from the steam turbine is introduced to a heat exchange portion of a condenser, is cooled and condensed by cooling water such as sea water in the heat exchange portion, and is introduced to a water supply system of the waste heat recovery boiler as a condensate.

CITATION LIST

Patent Literature

[PTL 1] Japanese Unexamined Patent Application, First Publication No. H11-117712

SUMMARY OF INVENTION

Technical Problem

In the gas turbine combined plant (combined cycle plant) disclosed in PTL 1, a first compressor may be used instead of the first generator and a second compressor which is connected to a plant may be used instead of the second generator.

In this case, the second compressors driven by the steam turbine are often used in processes different each other in a series of processes of the plant, and if even one second compressor cannot be driven, the plant cannot be operated (the plant stops).

Accordingly, in a case where the plurality of second compressors compresses the process gas in processes different from each other in a series of processes, if the waste heat recovery boiler stops due to a failure, it is difficult to compress the process gas by the compressor in which the waste heat recovery boiler is failed. Accordingly, since other devices (devices including a manufacturing device, a processing device, or the like) in the plant cannot be operated, there is a problem that a product cannot be produced in the plant.

Compared to a case where the first and second generators are used, this problem becomes a very serious problem.

Accordingly, the present invention provides a combined cycle plant in which it is possible to prevent a production of a product in a plant connected to a compressor from stopping by operating the compressor connected to a steam turbine even in a case where a waste heat recovery boiler is failed.

Solution to Problem

According to a first aspect of the present invention, there is provided a combined cycle plant including: a plurality of turbine devices; and a connection line, in which each of the plurality of turbine devices includes a gas turbine unit which includes a gas turbine, a first compressor driven by power obtained from the gas turbine, and a waste heat recovery boiler which converts water into steam using a high-temperature exhaust gas discharged from the gas turbine, a steam turbine unit which includes a steam turbine to which the steam is supplied, and a second compressor which is driven by power obtained from the steam turbine and contributes to compression of a process gas in a plant, and steam supply lines which are connected to the waste heat recovery boiler and the steam turbine to supply the steam to the steam turbine, and the connection line is disposed between the steam supply lines configuring the plurality of turbine devices and connects the plurality of steam supply lines to each other.

In the combined cycle plant having the above-described configuration, even in a case where any of the waste heat recovery boilers configuring the plurality of gas turbine units is failed and steam cannot be supplied to the steam turbine of the turbine device including the failed waste heat recovery boiler, it is possible to supply a portion of steam supplied from the waste heat recovery boiler which has not been failed to the steam turbine of the turbine device including the failed waste heat recovery boiler via the connection line.

Accordingly, since it is possible to operate the steam turbine of the turbine device including the failed waste heat recovery boiler to obtain power, it is possible to operate the second compressor which is connected to the steam turbine.

Accordingly, in a case where the second compressors are used to compress the process gas in a series of processes in the plant, since it is possible to continuously use (operate) other devices (devices including a manufacturing device, a processing device, or the like) in the plant, and it is possible to prevent a production stop in a plant.

In addition, in the combined cycle plant according to a second aspect of the present invention, the waste heat recovery boiler may include a first superheater to which the high-temperature exhaust gas is supplied and which performs heat exchange between steam supplied via an evaporator and a drum and the high-temperature exhaust gas, an auxiliary combustion device which heats the exhaust gas, which is supplied from the first superheater and has a lower temperature than that of the high-temperature exhaust gas, using a fuel, and a second superheater to which the exhaust gas heated by the auxiliary combustion device and the steam supplied from the first superheater are supplied, and which performs heat exchange between the exhaust gas and the steam and leads out the steam subjected to the heat exchange into the steam supply line.

According to this configuration, when any waste heat recovery boiler among the plurality of waste heat recovery boilers is failed, it is possible to increase the fuel supplied to the auxiliary combustion device of the waste heat recovery boiler which has not been failed so as to generate a large amount of steam from the waste heat recovery boiler which has not been failed.

Accordingly, it is possible to supply a portion of the steam generated in the waste heat recovery boiler which has not been failed to the steam turbine configuring the turbine device including the failed waste heat recovery boiler.

In addition, in the combined cycle plant according to a fourth aspect of the present invention, the combined cycle plant may further include: a detection unit which is provided in the steam supply line positioned between a connection position of the connection line and the waste heat recovery boiler and acquires data for determining whether or not the waste heat recovery boiler is normally operated, and a control device which performs a control to increase an amount of the fuel supplied to the auxiliary combustion devices configuring the plurality of turbine devices, when a numerical value of the data is lower than a preset threshold value.

Since the detection unit and the control device are provided, when any waste heat recovery boiler among the plurality of waste heat recovery boilers is failed, it is possible to perform the control which increases the fuel supplied to the auxiliary combustion device of the waste heat recovery boiler which has not been failed.

Accordingly, it is possible to generate a large amount of steam from the waste heat recovery boiler which has not been failed, and it is possible to compensate for steam to be generated from the failed waste heat recovery boiler with other waste heat recovery boilers.

Moreover, in the combined cycle plant according to a fifth aspect of the present invention, the control device may stop an operation of the waste heat recovery boiler which is connected to the steam supply line in which the numerical value of the data is lower than the preset threshold value.

Accordingly, it is possible to prevent other portions of the failed waste heat recovery boiler from being failed. In addition, it is possible to ensure safety of a worker by stopping the failed waste heat recovery boiler. Moreover, it is possible to check and repair the failed waste heat recovery boiler.

In addition, in the combined cycle plant according to a sixth aspect of the present invention, the detection unit may be configured of at least one of a temperature detection unit which detects a temperature inside the steam supply line positioned on the lead-out side of the waste heat recovery boiler, a flow rate detection unit which detects a flow rate of the steam flowing through the steam supply line positioned on the lead-out side of the waste heat recovery boiler, and a pressure detection unit which detects a pressure inside the steam supply line positioned on the lead-out side of the waste heat recovery boiler.

In this way, since the detection unit is configured of at least one of the temperature detection unit, the flow rate detection unit, and the pressure detection unit, it is possible to acquire data for determining whether or not the waste heat recovery boiler is normally operated by the detection unit.

Advantageous Effects of Invention

According to the present invention, it is possible to operate the compressor connected to the steam turbine even in a case where the waste heat recovery boiler is failed.

DESCRIPTION OF EMBODIMENTS

Embodiment

Figure 1:
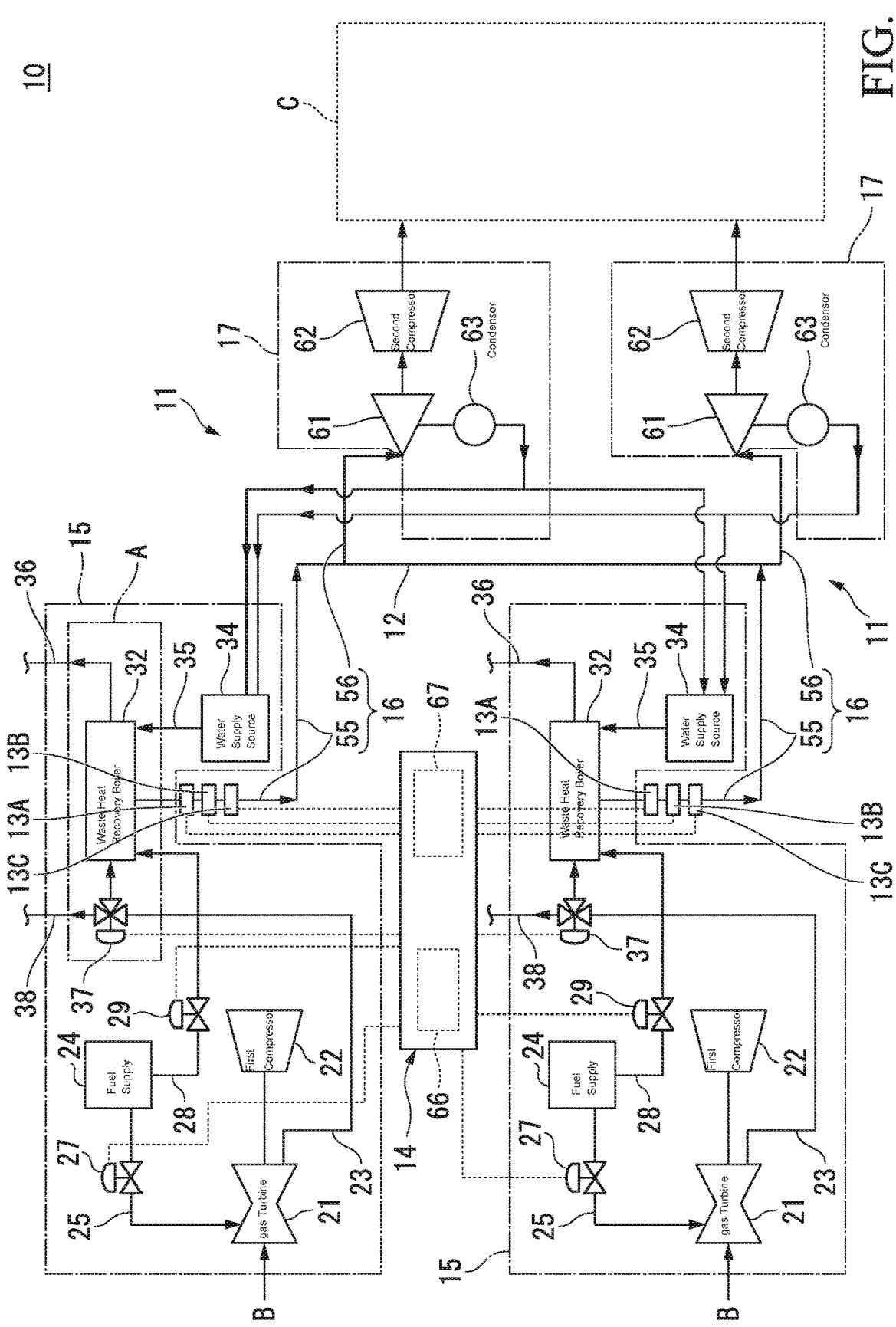
FIG. 1 is a figure schematically showing a schematic configuration of a combined cycle plant according to an embodiment of the present invention.

FIG. 1 is a figure schematically showing a schematic configuration of a combined cycle plant according to an embodiment of the present invention.

In FIG. 1, A indicates a region (hereinafter, referred to as a "region A") which surrounds a waste heat recovery boiler and the surrounding thereof, B indicates an inflow air (hereinafter, referred to as an "inflow air B"), and C indicates a plant (hereinafter, referred to as a "plant C") including devices such as a manufacturing device, a processing device, or the like. In addition, in FIG. 1, due to space limitations of the drawing, only two turbine devices 11 are shown.

With reference to FIG. 1, a combined cycle plant 10 of the present embodiment includes a plurality of turbine devices 11 (two turbine devices 11 in the case of the present embodiment), a connection line 12, a temperature detection unit 13A, a pressure detection unit 13B, a flow rate detection unit 13C, and a control device 14.

The turbine device 11 includes a gas turbine unit 15, a steam supply line 16, and a steam turbine unit 17.

The gas turbine unit 15 includes a gas turbine 21, a first compressor 22, an exhaust gas supply line 23, a fuel supply source 24, a first fuel supply line 25, automatic valves 27 and 29, a second fuel supply line 28, a waste heat recovery boiler 32, a water supply source 34, a water supply line 35, a first exhaust line 36, an exhaust switching valve 37 (three-way valve), and a second exhaust line 38.

The gas turbine 21 is connected to the first compressor 22 in a state where the gas turbine 21 can supply power to the first compressor 22. For example, the gas turbine 21 is configured to include a compressor (not shown), a combustor (not shown), a turbine (not shown), or the like (not shown). The turbine (not shown) is connected to one end of the exhaust gas supply line 23.

In the case of the configuration, in the gas turbine 21, the inflow air B is compressed by the compressor (not shown), a fuel is injected to compressed high-pressure air in the combustor (not shown) so as to be combusted, and thereafter, the turbine (not shown) is rotated by high-temperature and high-pressure air, and power is extracted as a turning force. In this case, an exhaust gas is exhausted from a turbine (not shown).

The combustor (not shown) is connected to the other end of the first fuel supply line 25. A fuel is supplied from the fuel supply source 24 is supplied to the combustor (not shown) via the first fuel supply line 25.

The first compressor 22 is connected to the gas turbine 21. The first compressor 22 is a compressor which is driven by power obtained from the gas turbine 21.

The other end of the exhaust gas supply line 23 is connected to the exhaust switching valve 37 (three-way valve). The exhaust switching valve 37 is a valve for switching the flow of the exhaust gas into two directions (that is, for switching the flow of the exhaust gas into two lines).

One line connected to the exhaust switching valve 37 is connected to the waste heat recovery boiler 32 (specifically, a first superheater 45 described later). In addition, the other line is connected to the second exhaust line 38. The exhaust gas supply line 23 is a line for supplying the exhaust gas discharged from the turbine (not shown) configuring the gas turbine 21 to the first superheater 45 configuring the waste heat recovery boiler 32.

The fuel supply source 24 is connected to one end of the first fuel supply line 25 and one end of the second fuel supply line 28. The fuel supply source 24 supplies the fuel to the combustor (not shown) configuring the gas turbine 21 via the first fuel supply line 25 and supplies the fuel to the waste heat recovery boiler 32 via the second fuel supply line 28. The other end of the second fuel supply line 25 is connected to an auxiliary combustion device 46 described later which configures the waste heat recovery boiler 32.

The automatic valve 27 is provided in the first fuel supply line 25. The automatic valve 27 is a valve for adjusting the flow rate of the fuel which is supplied to the gas turbine 21.

The automatic valve 29 is provided in the second fuel supply line 28. The automatic valve 29 is a valve for adjusting the flow rate of the fuel supplied to the auxiliary combustion device 46 configuring the waste heat recovery boiler 32.

The exhaust switching valve 37 is a valve for switching the flow of the exhaust gas.

The automatic valves 27 and 29 and the exhaust switching valve 37 are electrically connected to the control device 14. An opening degree of each of the automatic valves 27 and 29 is automatically adjusted by the control device 14. An exhaust direction of the exhaust switching valve 37 is automatically adjusted by the control device 14.

The automatic valves 27 and 29 are electrically connected to the control device 14, and the opening degree of each of the automatic valves 27 and 29 is automatically adjusted by the control device 14.

Figure 2:
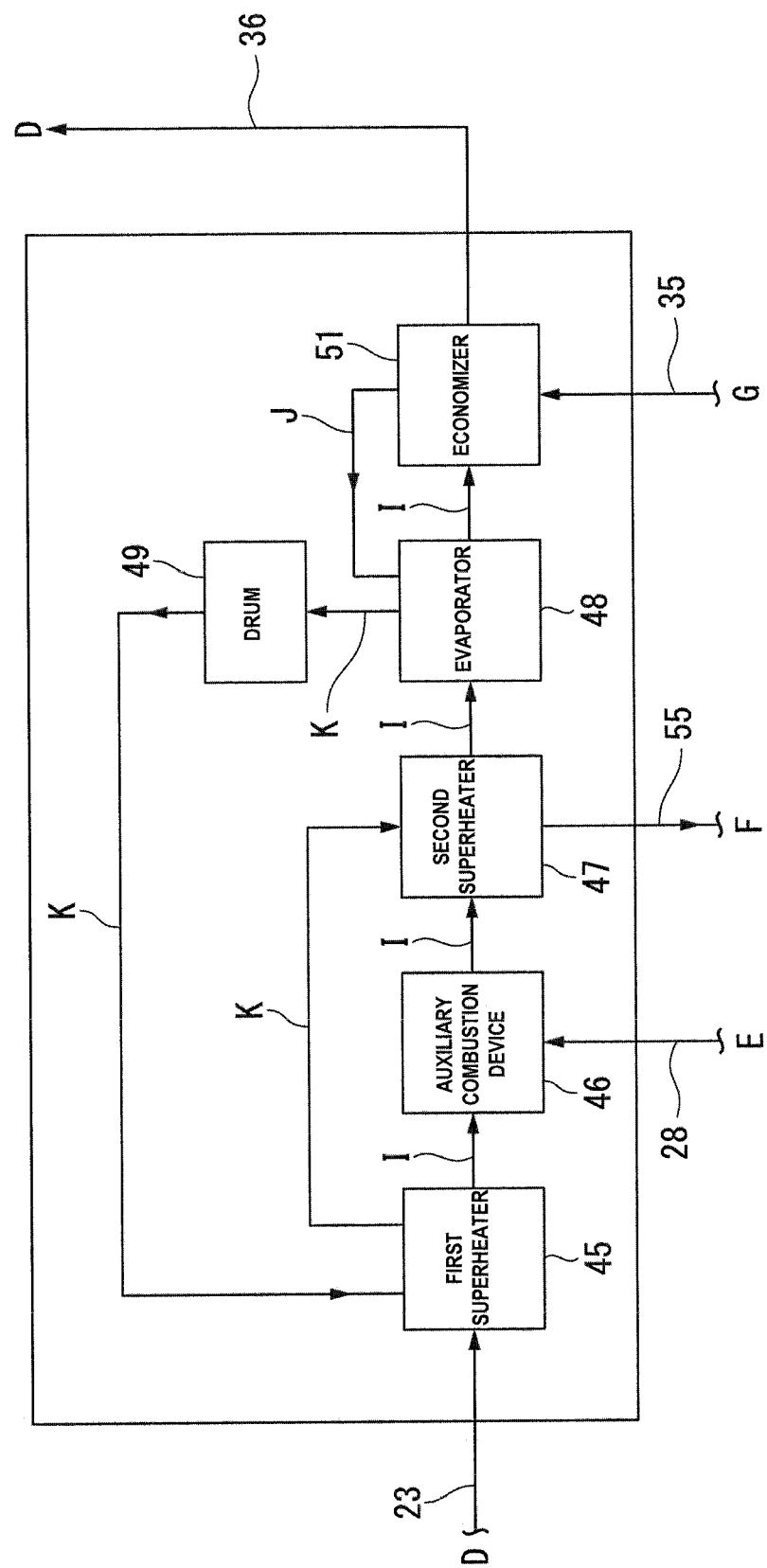
FIG. 2 is an enlarged figure showing a portion surrounded by a region A in FIG. 1 and is a figure for explaining an internal configuration of a waste heat recovery boiler.

FIG. 2 is an enlarged figure showing a portion surrounded by the region A in FIG. 1 and is a figure for explaining an internal configuration of the waste heat recovery boiler. In FIG. 2, the same reference numerals are assigned to the same configuration portions as those of the structure shown in FIG. 1.

In FIG. 2, D indicates a high-temperature exhaust gas (hereinafter, referred to an "exhaust gas D") discharged from the gas turbine 21, E indicates a fuel (hereinafter, referred to as a "fuel E") supplied to the auxiliary combustion device 46, F indicates steam (hereinafter, referred to as "steam F") generated in the waste heat recovery boiler 32, and G indicates water (hereinafter, referred to as "water G") supplied to an economizer 51 described later configuring the waste heat recovery boiler 32.

In addition, in FIG. 2, I indicates a movement direction (hereinafter, referred to an "I direction") of the exhaust gas D, J indicates a movement direction of the water G, and K is a movement direction of the steam (that is, evaporated water G).

Next, the waste heat recovery boiler 32 will be described with reference to FIGS. 1 and 2.

The waste heat recovery boiler 32 includes the first superheater 45, the auxiliary combustion device 46, a second superheater 47, an evaporator 48, a drum 49, and the economizer 51.

The first superheater 45 is connected to the other end of the exhaust gas supply line 23. The high-temperature (for example, approximately 500° C.) exhaust gas D is supplied from the gas turbine 21 to the first superheater 45 via the exhaust gas supply line 23.

The steam which is the water G evaporated by the evaporator 48 is supplied to the first superheater 45 via the drum 49.

The first superheater 45 performs heat exchange between the exhaust gas D and the steam supplied from the drum 49 and supplies the heated steam to the second superheater 47. According to this heat exchange, the temperature of the exhaust gas D becomes lower (for example, decreases to a temperature of approximately 350° C.) than the temperature of the exhaust gas D when supplied from the gas turbine 21.

For example, a heat exchanger can be used as the first superheater 45.

The auxiliary combustion device 46 is connected in a state where the auxiliary combustion device 46 can introduce the exhaust gas D led out from the first superheater 45, and is connected to the second superheater 47 in a state where the auxiliary combustion device 46 can supply the exhaust gas D led out from the auxiliary combustion device 46 to the second superheater 47.

The fuel E for driving the auxiliary combustion device 46 is supplied to the auxiliary combustion device 46 via the second fuel supply line 28. Preferably, the fuel E which is the same as the fuel supplied to the gas turbine 21 is used. Accordingly, since only one fuel supply source 24 may be provided, it is possible to simplify the configuration of the gas turbine unit 15.

The auxiliary combustion device 46 is a device for heating the exhaust gas D in which the temperature decreases. The exhaust gas D is heated by the auxiliary combustion device 46, and the exhaust gas D having a high temperature (for example, 800° C.) is supplied to the second superheater 47.

For example, a duct burner can be used as the auxiliary combustion device 46 having the above-described configuration.

The second superheater 47 is connected to one end of a first portion 55 described later configuring the steam supply line 16.

The exhaust gas D having a high temperature (for example, 800° C.) due to the auxiliary combustion device 46 is supplied to the second superheater 47. Accordingly, the second superheater 47 has a structure (structure having sufficient heat resistance) to endure the exhaust gas D having a high temperature.

In the second superheater 47, heat exchange between the exhaust gas D having a high temperature due to the auxiliary combustion device 46 and the steam supplied from the first superheater 45 is performed. Accordingly, the temperature of the steam increases, and the temperature of the exhaust gas D decreases.

The steam F led out from the second superheater 47 is lead out to the steam supply line 16 (specifically, first portion 55). In addition, the exhaust gas D led out from the second superheater 47 is supplied to the evaporator 48.

Here, the reason why the above-described auxiliary combustion device 46 is disposed between the first superheater 45 and the second superheater 47 when viewed in the movement direction (I direction) of the exhaust gas D will be described.

For example, in a case where the auxiliary combustion device 46 is provided in the exhaust gas supply line 23 positioned in the front stage of the first superheater 45, since the high-temperature exhaust gas D supplied from the gas turbine 21 is further heated by the auxiliary combustion device 46, the first superheater 45 is required so as to be configured of a structure having a sufficient heat resistance like the second superheater 47.

However, if this is performed, since a material cost of the first superheater 45 increases, a cost of the waste heat recovery boiler 32 increases.

In addition, if the auxiliary combustion device 46 is provided in the exhaust gas supply line 23 positioned in the front stage of the first superheater 45, since the exhaust gas D which is led out from the first superheater 45 and has a low temperature is introduced into the second superheater 47, it is difficult to perform sufficient heat exchange in the second superheater 47.

Hereinbefore, according to the above-described reasons, preferably, the auxiliary combustion device 46 is disposed between the first superheater 45 and the second superheater 47 when viewed in the movement direction (I direction) of the exhaust gas D.

The evaporator 48 is connected to the economizer 51 in a state where the evaporator 48 can introduce the water G (heated water G) led out from the economizer 51, and is connected to the economizer 51 in a state where the evaporator 48 can supply the exhaust gas D led out from the evaporator 48 to the economizer 51.

The evaporator 48 evaporates the water G which is supplied from the economizer 51 and is heated. In this case, the water G is evaporated using heat of the exhaust gas D. The evaporator 48 supplies the evaporated water G to the drum 49. The evaporated water G includes the water G which has not been evaporated and the steam.

In addition, the evaporator 48 supplies the exhaust gas D having a low temperature due to generation of steam to the economizer 51.

The drum 49 is connected to the first superheater 45 in a state where the drum 49 can supply steam to the first superheater 45. The drum 49 separates the water G which has not been evaporated and the steam which are included in the evaporated water G supplied from the evaporator 48. The steam separated by the drum 49 is supplied to the first superheater 45.

The economizer 51 is connected to the other end of the water supply line 35 connected to the water supply source 34. The water G is supplied from the water supply source 34 to the economizer 51 via the water supply line 35.

In the economizer 51, the water G is heated using the exhaust gas D supplied from the evaporator 48. The water G heated by the economizer 51 is supplied to the evaporator 48.

In addition, the economizer 51 is connected to one end of the first exhaust line 36. The exhaust gas D which is used in the economizer 51 is exhausted to the outside of the waste heat recovery boiler 32 via the first exhaust line 36.

As described above, the waste heat recovery boiler 32 includes the first superheater 45 to which the high-temperature exhaust gas D is supplied and which performs heat exchange between the steam supplied via the evaporator 48 and the drum 49 and the high-temperature exhaust gas D, the auxiliary combustion device 46 which heats the exhaust gas D, which is supplied from the first superheater 45 and has a lower temperature than that of the high-temperature exhaust gas D, using the fuel E, and the second superheater 47 to which the exhaust gas D heated by the auxiliary combustion device 46 and the steam supplied from the first superheater 45 are supplied, and which performs heat exchange between the exhaust gas D and the steam and leads out the steam subjected to the heat exchange into the steam supply line 16.

According to this configuration, when any waste heat recovery boiler 32 among the waste heat recovery boilers 32 (the plurality of waste heat recovery boilers) configuring the turbine device 11 is failed, it is possible to increase the fuel E supplied to the auxiliary combustion device 46 of the waste heat recovery boiler 32 which has not been failed so as to generate a large amount of steam from the waste heat recovery boiler 32 which has not been failed.

Accordingly, it is possible to supply a portion of the steam F generated by the waste heat recovery boiler 32 which has not been failed to a steam turbine 61 (a steam turbine described later) configuring the turbine device (in this case, the turbine device 11 or the turbine device 12) including the failed waste heat recovery boiler 32 via the connection line 12 described later.

The water supply source 34 is connected to one end of the water supply line 35, and is connected to a condenser 63 described later in a state where the water supply source 34 can recover water from the condenser 63.

The water supply source 34 supplies the water G, which is required when steam is generated, to the economizer 51 via the water supply line 35. In addition, the water supply source 34 reuses the water recovered from the condenser 63 as the water G.

The first exhaust line 36 is a line for exhausting the exhaust gas D used in the economizer 51 to the outside of the waste heat recovery boiler 32.

The steam supply line 16 includes the first portion 55 and a second portion 56. One end of the first portion 55 is connected to the second superheater 47 and the other end of the first portion 55 is connected to the connection line 12. The first portion 55 introduces the steam F led out from the second superheater 47 into the connection line 12.

One end of the second portion 56 is connected to the connection line 12 which is positioned in the vicinity of the joined position (connection position) of the first portion 55, and the other end of the second portion 56 is connected to a steam turbine 61 described later configuring the turbine device 11.

The steam F is introduced into the second portion 56 via the connection line 12. The steam F introduced into the second portion 56 is supplied to the steam turbine 61 configuring the turbine device 11.

In addition, the steam supply lines 16 configuring the plurality of turbine devices 11 are connected to the same connection line 12 at positions different from each other. Accordingly, the steam F led out from the gas turbine units 15 of the plurality of turbine devices 11 is supplied to the connection line 12.

The steam turbine unit 17 includes the steam turbine 61, a second compressor 62, and the condenser 63. The steam turbine 61 rotates vanes (not shown) configuring the steam turbine 61 by the steam F supplied via the connection line 12 and the second portion 56 to generate power.

The steam turbine 61 is connected to the second compressor 62 in a state where the steam turbine 61 can supply the generated power to the second compressor 62.

As the second compressor 62, a compressor is used, which supplies the process gas to devices (specifically, for example, devices which include a manufacturing device which manufactures a product, a processing device which processes a process gas, or the like) inside the plant C. That is, the second compressor 62 is a compressor which contributes to the compression of the process gas inside the plant.

In this way, the second compressor 62 is provided, a process gas is supplied to the devices inside the plant C using the second compressor 62, and it is possible to use (operate) devices (devices which include a manufacturing device which manufactures a product, a processing device which processes a process gas, or the like) inside the plant C. Accordingly, it is possible to prevent production of a product in the plant C from stopping.

The condenser 63 is connected to the steam turbine 61 and the water supply source 34. The condenser 63 recovers the steam F used when the steam turbine 61 generates power and condenses the steam F to generate the water G. The condenser 63 returns the water G to the water supply source 34 to reuse the water G.

The connection line 12 is disposed between the steam supply lines 16 configuring the plurality of turbine devices 11 and is disposed so as to connect the plurality of steam supply lines 16 to each other.

The connection line 12 has a function which collects the steam F supplied from the respective waste heat recovery boilers 32 configuring the plurality of turbine devices 11 at once and supplies the steam F to the respective steam turbines 61 configuring the plurality of turbine devices 11.

In this way, since the connection line 12 which connects the plurality of steam supply lines 16 is provided, even in a case where any of the waste heat recovery boilers 32 provided in the plurality of gas turbine unit 15 is failed and the steam F cannot be supplied to the steam turbine 61 connected to the failed waste heat recovery boiler 32, it is possible to supply a portion of the steam F supplied from the waste heat recovery boiler 32 which has not been failed to the steam turbine 61 of the turbine device 11 including the failed waste heat recovery boiler 32 via the connection line 12.

Accordingly, since it is possible to operate the steam turbine 61 of the turbine device 11 including the failed waste heat recovery boiler 32 to obtain power, it is possible to operate the second compressor 62.

The temperature detection unit 13A, the pressure detection unit 13B, and the flow rate detection unit 13C are provided in the first portion 55 (that is, the steam supply line 16 positioned between a connection position of the connection line 12 and the waste heat recovery boiler 32) which is positioned in the vicinity of the waste heat recovery boiler 32.

Each of the temperature detection unit 13A, the pressure detection unit 13B, and the flow rate detection unit 13C is a detection unit which acquires data for determining whether or not the waste heat recovery boiler 32 is normally operated.

The temperature detection unit 13A is a detection unit which detects a temperature inside the steam supply line 55 (that is, inside the first portion 55) positioned on the lead-out side of the waste heat recovery boiler 32.

During the operation of the waste heat recovery boiler 32, the temperature detection unit 13A continuously transmits data related to the detected temperature to the control device 14. For example, as the temperature detection unit 13A, a thermocouple can be used.

The pressure detection unit 13B is a detection unit which detects a pressure inside the steam supply line 55 (that is, inside the first portion 55) positioned on the lead-out side of the waste heat recovery boiler 32.

During the operation of the waste heat recovery boiler 32, the pressure detection unit 13B continuously transmits data related to the detected pressure to the control device 14. For example, as the pressure detection unit 13B, a pressure sensor, a pressure gauge, or the like can be used.

The flow rate detection unit 13C is a detection unit which detects the flow rate of the steam F which flows through the steam supply line 55 (that is, through the first portion 55) positioned on the lead-out side of the waste heat recovery boiler 32.

During the operation of the waste heat recovery boiler 32, the flow rate detection unit 13C continuously transmits data related to the detected flow rate of the steam F to the control device 14. For example, as the flow rate detection unit 13C, a flowmeter (specifically, for example, a digital vortex flowmeter) can be used.

Since the detection unit including the above-described temperature detection unit 13A, pressure detection unit 13B, and flow rate detection unit 13C is provided in the first portion 55, it is possible to acquire data for determining whether or not the waste heat recovery boiler 32 is normally operated by the detection unit.

In addition, in FIG. 1, as the detection unit which acquires the data for determining whether or not the waste heat recovery boiler 32 is normally operated, the case where the temperature detection unit 13A, the pressure detection unit 13B, and the flow rate detection unit 13C which are three detection units are provided is described as an example. However, the detection unit may be configured of at least one of the temperature detection unit 13A, the pressure detection unit 13B, and the flow rate detection unit 13C.

That is, the detection unit may be configured of one detection unit among the temperature detection unit 13A, the pressure detection unit 13B, and the flow rate detection unit 13C, or two detection units among the temperature detection unit 13A, the pressure detection unit 13B, and the flow rate detection unit 13C.

Even in this case, it is possible to acquire data for determining whether or not the waste heat recovery boiler 32 is normally operated by the detection unit.

The control device 14 includes a storage unit 66 and a control portion 67. In the storage unit 66, a program for executing the control of the combined cycle plant 10, a lower limit temperature threshold value which is a threshold value related to the temperature of the steam F in the first portion 55, a lower limit pressure threshold value which is a threshold value related to the pressure inside the first portion 55, a lower limit flow rate threshold value which is a threshold value related to the flow rate of the steam F in the first portion 55, a program for executing comparisons between the above-described respective threshold values (the preset lower limit temperature threshold value, the preset lower limit pressure threshold value, and the preset lower limit flow rate threshold value) and the numerical values of the data detected by the temperature detection unit 13A, the pressure detection unit 13B, and the flow rate detection unit 13C, or the like is stored.

The control portion 67 performs the entire control of the combined cycle plant 10 based on the programs stored in the storage unit 66.

In addition, the control portion 67 determines whether or not the data detected by the temperature detection unit 13A, the pressure detection unit 13B, and the flow rate detection unit 13C is lower than the above-described respective threshold values, and when the numerical value of at least one data among the data detected by the three detection units is lower than the preset threshold value, the control portion 67 determines that the operation of the waste heat recovery boiler 32 is abnormal (failed) and stops the waste heat recovery boiler 32 in which abnormality occurs.

Specifically, the control portion 67 closes the automatic valve 29 configuring the turbine device 11 having the waste heat recovery boiler 32 in which abnormality occurs, switches the exhaust switching valve 37 to the second exhaust line 38 such that the exhaust gas is not introduced to the waste heat recovery boiler 32, and stops the waste heat recovery boiler 32 in which abnormality occurs (that is, the failed waste heat recovery boiler 32).

In this way, it is possible to ensure safety of a worker by stopping the waste heat recovery boiler 32 in which abnormality occurs. Moreover, it is possible to check and repair the failed waste heat recovery boiler 32.

In addition, when abnormality of the waste heat recovery boiler 32 occurs, the control portion 67 controls the automatic valve 29 such that the opening degree of the automatic valve 29 of the turbine device 11 having the waste heat recovery boiler 32 in which abnormality has not occurred in the waste heat recovery boiler 32 increases.

According to the control, since a larger amount of the fuel E is supplied to the waste heat recovery boiler 32 in which abnormality has not occurred, it is possible to improve processing capacity of the waste heat recovery boiler 32.

Accordingly, it is possible to generate a large amount of steam F from the waste heat recovery boiler 32 in which abnormality has not occurred, and it is possible to compensate for steam F to be generated from the failed waste heat recovery boiler 32 with the waste heat recovery boiler 32 in which abnormality has not occurred.

Figure 3:
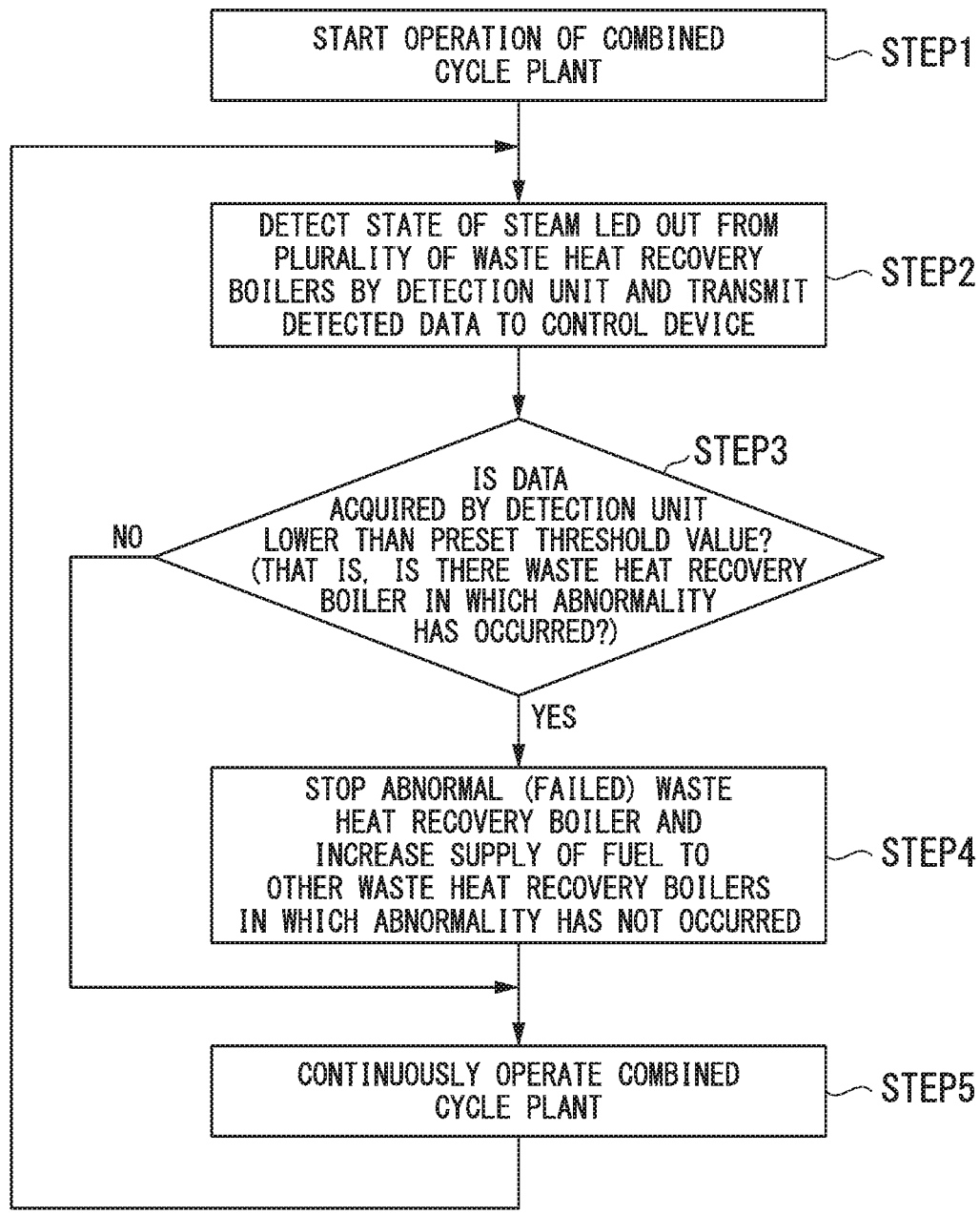
FIG. 3 is a flowchart showing processing which is performed by a control device when abnormality (failure) occurs in some waste heat recovery boilers among a plurality of waste heat recovery boilers.

FIG. 3 is a flowchart showing processing which is performed by the control device when abnormality (failure) occurs in some waste heat recovery boilers among the plurality of waste heat recovery boilers.

Here, with reference to FIGS. 1 and 3, the processing which is performed by the control device 14 when abnormality (failure) occurs in some waste heat recovery boilers 32 among the plurality of waste heat recovery boilers 32 will be described.

In FIG. 3, in STEP 1, the operation of the combined cycle plant 10 shown in FIG. 1 starts.

Subsequently, in STEP 2, the state (specifically, the temperature inside the first portion 55, the pressure inside the first portion 55, and the flow rate of the steam F led out to the first portion 55) of the steam led out from the plurality of waste heat recovery boilers 32 is detected by the detection units (the temperature detection unit 13A, the pressure detection unit 13B, and the flow rate detection unit 13C), and the detected data is transmitted to the control device.

Subsequently, in STEP 3, whether or not the numerical value of the data acquired by the detection unit is lower than the preset threshold value (specifically, the above-described lower limit temperature threshold value, lower limit pressure threshold value, and lower limit flow rate threshold value) is determined by the control device 14. That is, whether or not there is the waste heat recovery boiler 32 in which abnormality has occurred is determined.

In STEP 3, if it is determined that there is the waste heat recovery boiler 32 in which abnormality has occurred (determined as Yes), the processing proceeds to STEP 4.

Moreover, in STEP 3, if it is determined that there is no waste heat recovery boiler 32 in which abnormality has occurred (determined as No), the processing proceeds to STEP 5, the combined cycle plant 10 is continuously operated, and the processing returns to STEP 2.

In STEP 4, the abnormal (failed) waste heat recovery boiler 32 is stopped by the control device 14 and the supply of the fuel to other waste heat recovery boilers 32 in which abnormality has not occurred increases.

According to the combined cycle plant 10 of the present embodiment, even in a case where any of the waste heat recovery boilers 32 configuring the plurality of gas turbine units 15 is failed and the steam F cannot be supplied to the steam turbine 61 connected to the failed waste heat recovery boiler 32, it is possible to supply a portion of the steam F supplied from the waste heat recovery boiler 32 which has not been failed to the steam turbine 61 connected to the failed waste heat recovery boiler 32 via the connection line 12.

Accordingly, since it is possible to operate the steam turbine 61 configuring the turbine device 11 including the failed waste heat recovery boiler 32 to obtain power, it is possible to operate the second compressor 62 which is connected to the steam turbine 61.

Accordingly, since the second compressor 62 is used to compress the process gas in a series of processes in the plant C, since it is possible to continuously use (operate) other devices (devices including a manufacturing device, a processing device, or the like) in the plant C, and it is possible to prevent a production of the plant C from stopping.

Hereinbefore, the embodiment of the present invention is described in detail with reference to the drawings. However, components in the present embodiment and a combination thereof are examples, and addition, omission, replacement, and other modifications of configurations may be performed within a scope which does not depart from the gist of the present invention. In addition, the present invention is not limited by the above-described embodiment and is limited by only claims.

For example, in the present embodiment, as an example, the case is described, in which when at least the numerical value of one data among three data acquired by the temperature detection unit 13A, the pressure detection unit 13B, and the flow rate detection unit 13C is lower than the preset threshold value, it is determined that the operation of the waste heat recovery boiler 32 is abnormal (failed) and the waste heat recovery boiler 32 in which abnormality has occurred is stopped. However, the present invention is not limited to this.

For example, in a case where two detection units in which the kinds are different from each other are provided, when the numerical values of two data acquired by the two detection units are lower than the respective preset threshold values, the operation of the waste heat recovery boiler 32 which is determined as abnormality may stop, and the fuel E supplied to the auxiliary combustion device 46 of the normal waste heat recovery boiler 32 may increase.

In addition, for example, in a case where one detection unit is provided, when the numerical value of the data acquired by one detection unit is lower than the preset threshold value, the operation of the waste heat recovery boiler 32 which is determined as abnormality may stop, and the fuel E supplied to the auxiliary combustion device 46 of the normal waste heat recovery boiler 32 may increase.

In addition, in the present embodiment, for example, the case in which the connection line 12 is provided so as to connect the steam supply lines 16 of the two turbine devices 11 is described. However, the number of the turbine devices 11 connected to the connection line 12 may be any as long as the number is a plurality of numbers (two or more), and the number is not limited to the number (two) of the turbine devices 11 shown in FIG. 1.

In addition, many turbine devices 11 may be connected to the connection line 12 if possible. Accordingly, it is possible to sufficiently compensate for the steam F to be generated from the waste heat recovery boiler 32 in which abnormality has occurred with the normal waste heat recovery boiler 32 to which the fuel E is sufficiently supplied.

In the present embodiment, for example, the case is described in which abnormality (failure) of the waste heat recovery boiler 32 is determined by monitoring the state of the steam F led out from the waste heat recovery boiler 32. However, for example, by observing the level of the water inside the drum 49 configuring the waste heat recovery boiler 32, abnormality (failure) of the waste heat recovery boiler 32 may be determined based on the data related to the water level detected by the water level sensor.

In addition, the automatic valves (not shown) which are electrically connected to the control device 14 are respectively provided in the second portions 56 which are provided in the plurality of turbine devices 11, and when abnormality (failure) is occurred in the waste heat recovery boiler 32, the amounts of the steam F supplied to the respective steam turbines 61 may be equalized by controlling the plurality of automatic valves (not shown).

In addition, in a case where the plurality of second compressors 62 are compressors, a pressure gauge (not shown) which is electrically connected to the control device 14 is provided on an ejection port of each compressor, and the control may be performed such that the pressures indicated by the plurality of pressure gauges are equalized.

INDUSTRIAL APPLICABILITY

The combined cycle plant of the present invention is applied to a combined cycle plant including a gas turbine unit having a gas turbine, and a steam turbine unit including a steam turbine and a waste heat recovery boiler.

REFERENCE SIGNS LIST

10: combined cycle plant
11: turbine device
12: connection line
13A: temperature detection unit
13B: pressure detection unit
13C: flow rate detection unit
14: control device
15: gas turbine unit
16: steam supply line
17: steam turbine unit
21: gas turbine
22: first compressor
23: exhaust gas supply line
24: fuel supply source
25: first fuel supply line
27, 29: automatic valve
28: second fuel supply line
32: waste heat recovery boiler
34: water supply source
35: water supply line
36: first exhaust line
37: exhaust switching valve
38: second exhaust line
45: first superheater
46: auxiliary combustion device
47: second superheater
48: evaporator
49: drum
51: economizer
55: first portion
56: second portion
61: steam turbine
62: second compressor
63: condenser
66: storage unit
67: calculation unit
A: region
B: inflow air
C: plant
D: exhaust gas
E: fuel
F: steam
G: water

The invention claimed is:

1. A system comprising:
a plurality of combined cycle power plants; and
a connection line,
wherein the plurality of combined cycle power plants comprises a first combined cycle power plant and a second combined cycle power plant,
wherein the first combined cycle power plant includes:
a first gas turbine unit which includes a first gas turbine, a first compressor driven by power obtained from the first gas turbine, and a first waste heat recovery boiler which converts water into a first steam using a first exhaust gas discharged from the first gas turbine,
a first steam turbine unit which includes a first steam turbine to which the first steam is supplied, and a second compressor which is driven by power obtained from the first steam turbine and contributes to compression of a process gas in a plant, and
a first steam supply line which is connected to the first waste heat recovery boiler and the first steam turbine to supply the first steam to the first steam turbine,
wherein the second combined cycle power plant includes:
a second gas turbine unit which includes a second gas turbine, a third compressor driven by power obtained from the second gas turbine, and a second waste heat recovery boiler which converts water into a second steam using a second exhaust gas discharged from the second gas turbine,
a second steam turbine unit which includes a second steam turbine to which the second steam is supplied and a fourth compressor which is driven by power obtained from the second steam turbine and contributes to compression of the process gas in the plant, and
a second steam supply line which is connected to the second waste heat recovery boiler and the second steam turbine to supply the second steam to the second steam turbine,
wherein the connection line is disposed between the first steam supply line and the second steam supply line for connecting the first steam supply line and the second steam supply line,
wherein the first waste heat recovery boiler includes:
a first forward superheater to which the first exhaust gas is supplied and which performs heat exchange between the first steam, which has flowed past a first evaporator and a first drum, and the first exhaust gas,
a first auxiliary combustion device which heats the first exhaust gas which has flowed past the first forward superheater, and
a first aft superheater which performs heat exchange between the first exhaust gas and the first steam, and the first aft superheater configured to provide the first steam subjected to the heat exchange of the first aft superheater into the first steam supply line,
wherein the second waste heat recovery boiler includes:
a second forward superheater to which the second exhaust gas is supplied and which performs heat exchange between the second steam, which has flowed past a second evaporator and a second drum, and the second exhaust gas, a second auxiliary combustion device which heats the second exhaust gas which has flowed past the second forward superheater, and a second aft superheater which performs heat exchange between the second exhaust gas and the second steam, and the second aft superheater configured to provide the second steam subjected to the heat exchange of the second aft superheater into the second steam supply line, wherein in the first waste heat recovery boiler, the first exhaust gas flows in sequence past the first forward superheater, the first auxiliary combustion device, the first aft superheater, and the evaporator, and the first steam is cycled in the first waste heat recovery boiler by being directed from an outlet of the first drum to an inlet of the first forward superheater, through the first forward superheater to an outlet of the first forward superheater, to an inlet of the first aft superheater, through the first aft superheater, and directed from an outlet of the first aft superheater to the first evaporator and the first drum, and wherein in the second was heat recovery boiler, the second exhaust gas flows in a sequence past the second forward superheater, the second auxiliary combustion device, the second aft superheater, and the evaporator, and the second steam is cycled in the second waste heat recovery boiler by being directed from an outlet of the second drum to an inlet of the second forward superheater, through the second forward superheater to an outlet of the second forward superheater to an inlet of the second aft superheater through the second aft superheater, and directed from an outlet of the second aft superheater to the second evaporator and the second drum.

2. The system according to claim 1, further comprising:
a first sensor configured to acquire a first set of data;
a second sensor configured to acquire a second set of data; and
a control device configured to perform a first control to increase an amount of a fuel supplied to the first auxiliary combustion device when a numerical value in the second set of data is lower than a preset threshold value,
the control device further configured to perform a second control to increase an amount of a fuel supplied to the second auxiliary combustion device when a numerical value in the first set of data is lower than the preset threshold value,
wherein the first sensor is disposed between the first waste heat recovery boiler and a connection node connecting the connection line and the first steam supply line, and the second sensor is disposed between the second waste heat recovery boiler and a connection node connecting the connection line and the second steam supply line.

3. The system according to claim 2,
wherein the control device is configured to determine whether the numerical value in the first set of data is lower than the preset threshold value and then
to stop the operation of the first waste heat recovery boiler when the numerical value in the first set of data is lower than the threshold value, and
wherein the control device is further configured to determine whether the numerical value in the second set of data is lower than the preset threshold value and then to stop the operation of the second waste heat recovery boiler when the numerical value in the second set of data is lower than the threshold value.

4. The system according to claim 2,
wherein the first sensor includes a first temperature detection unit which detects a temperature inside the first steam supply line positioned on a lead-out side of the first waste heat recovery boiler, a first flow rate detection unit which detects a flow rate of the steam flowing through the first steam supply line, and a first pressure detection unit which detects a pressure inside the first steam supply line, and
the second sensor includes a second temperature detection unit which detects a temperature inside the second steam supply line positioned on a lead-out side of the second waste heat recovery boiler, a second flow rate detection unit which detects a flow rate of the steam flowing through the second steam supply line, and a second pressure detection unit which detects a pressure inside the second steam supply line.

5. The system according to claim 3,
wherein the first sensor includes a first temperature detection unit which detects a temperature inside the first steam supply line positioned on a lead-out side of the first waste heat recovery boiler, a first flow rate detection unit which detects a flow rate of the steam flowing through the first steam supply line, and a first pressure detection unit which detects a pressure inside the first steam supply line, and
the second sensor includes a second temperature detection unit which detects a temperature inside the second steam supply line positioned on a lead-out side of the second waste heat recovery boiler, a second flow rate detection unit which detects a flow rate of the steam flowing through the second steam supply line, and a second pressure detection unit which detects a pressure inside the second steam supply line.

* * * * *